Feb. 5, 1929.  1,701,365
H. T. HERR
POWER PLANT INSTALLATION
Filed March 31, 1927  2 Sheets-Sheet 1

WITNESSES:
E. Lutz

INVENTOR
H.T. Herr.
BY
A. B. Reavis
ATTORNEY

Feb. 5, 1929.  1,701,365
H. T. HERR
POWER PLANT INSTALLATION
Filed March 31, 1927   2 Sheets-Sheet 2

WITNESSES:
E. Lutz

INVENTOR
H. T. Herr.
BY
A. B. Reavis
ATTORNEY

Patented Feb. 5, 1929.

1,701,365

UNITED STATES PATENT OFFICE.

HERBERT T. HERR, OF MERION, PENNSYLVANIA, ASSIGNOR TO WESTINGHOUSE ELECTRIC & MANUFACTURING COMPANY, A CORPORATION OF PENNSYLVANIA.

POWER-PLANT INSTALLATION.

Application filed March 31, 1927. Serial No. 179,811.

My invention relates to prime mover generator apparatus, more particularly to that type employing an exciter, and it has for an object to provide apparatus of this character which shall be of a unitary type, which shall be relatively simple from the standpoints of supporting the component parts and of transmitting power from the prime mover to the generator and to the exciter, and which shall be very economical in its requirements for space.

In the applications of Henry F. Schmidt, Serial No. 118,257, filed June 24, 1926; and of Alexander T. Kasley and myself, Serial No. 179,814, filed March 31, 1927, both of which applications have been assigned to the Westinghouse Electric & Manufacturing Company, there are disclosed polyhedral forms of prime mover generator organizations which are characterized by the provision of polyhedral frames about which are disposed engine means and within which, in part at least, are disposed generators, each engine means including a plurality of crank shafts connected by suitable gearing to a generator. This type of power plant apparatus is peculiarly suitable for railway locomotives as the square formation is well adapted to fit the interior of a suitable car structure; and, as the power plant units may be spaced fairly close together, a locomotive of the Diesel electric type having relatively large power may be provided.

With Diesel electric locomotives, it is customary to provide exciters. In accordance with my present invention, I mount the exciter means above the polyhedral engine and drive it mechanically from any suitable part receiving power from the engine. With this arrangement, therefore, the lateral boundaries of a power plant unit are defined by the engine means, the generator being surrounded thereby, at least in part, and the exciter being supported thereabove, with the result that no floor space, in addition to that required for the engine means proper, is necessary either for the generator or for the exciter.

Accordingly, therefore, it is a further object of my invention to provide power plant units embodying internal combustion engine means, generators, and exciters so as to be peculiarly suitable for installation in locomotive car structures, which utilize to good advantage the interior spaces of said structures, and which do not require floor space for the generators and exciters.

These and other objects are effected by my invention as will be apparent from the following description and the accompanying drawings, forming a part of this application, in which.

Figure 1:
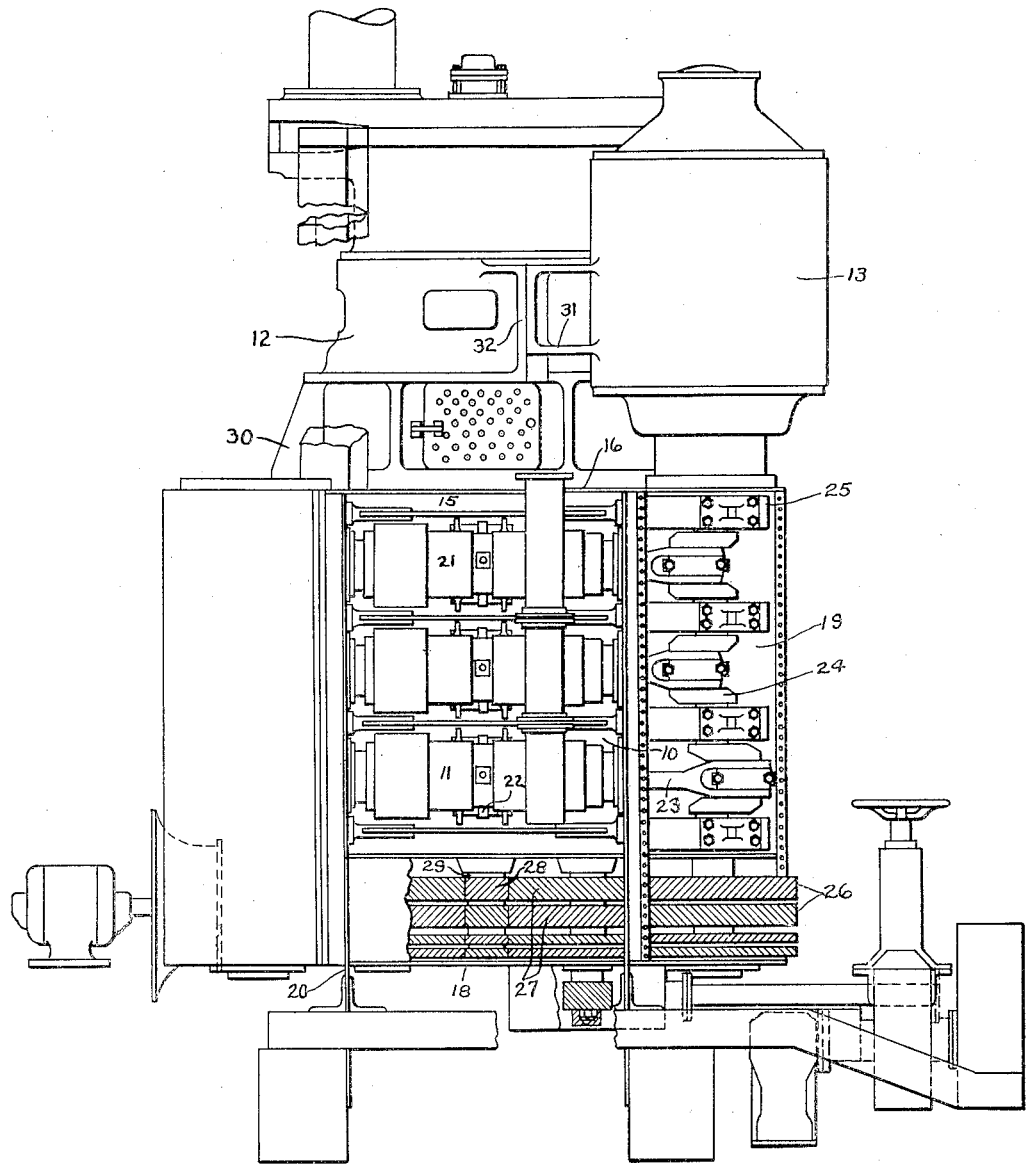
Fig. 1 is an elevation of a power plant installation embodying my improved organization.

Referring now to the drawings more in detail, I show a polyhedral frame 10, engine means 11 disposed about the frame and carried thereby, a generator 12 supported by the frame, and an exciter 13 supported by the generator. In Fig. 1, the exciter 13 is disposed laterally of the upper portion of the generator, while, in Figs. 3 and 4, the exciter is arranged above the generator. The generator and the exciter means are driven by the engine means as will hereinafter appear.

The frame 10 is of a polyhedral or box type, as disclosed more particularly in the application of Alexander T. Kasley and myself, already referred to, and consisting of vertical side plates 15, horizontal side plates 16, 17 and 18, and vertical corner or cylinder supporting plates 19. The cylinder supporting plates 19 are provided with lower or leg portions 20 which support the installation.

The engine means 11 embody a plurality of groups of cylinders 21 arranged horizontally, each group consisting of parallel cylinders arranged parallel to a vertical side plate 15. The terminal portions of the cylinders 21 are supported by the corner plates 19, whereas the intermediate portions of the cylinders are anchored by elements 22 carried by the side plates 15. The pistons in the cylinders are connected by rods 23 to corner crank shafts 24 carried by bearings 25 arranged in the angular spaces between the vertically disposed cylinder supporting plates 19 adjacent to the vertical corners of the structure.

The crank shafts 24 have gears 26 connected to the lower ends thereof and meshing with idlers 27, the latter, in turn, meshing with the driven gear 28 on the rotor shaft 29 of the generator 12. The gearing is arranged below the generator and the engine means and is located between the horizontal plates 17 and 18.

The generator 12 depends within and extends above the frame 10, it preferably being provided with feet 30 bearing on the top of the frame.

Figure 2:
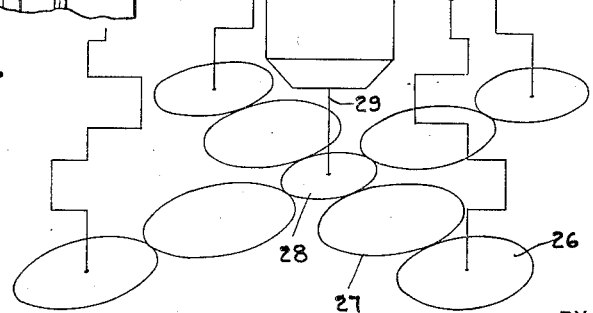
Fig. 2 is a diagrammatic view showing more clearly mechanical interconnections of the structure shown in Fig. 1; and, Figs. 3 and 4 are detail views showing modified ways of driving the exciter means.

In Fig. 1, I show the exciter 13 aligned with the right hand front crank shaft, bracket means 31 being provided for securement to bracket means 32 on the generator. As may be seen from diagrammatic Fig. 2, the exciter rotor is connected by a suitable coupling 33 to the upper end of one of the crank shafts 24. It will also be clear from Fig. 2, that all of the crank shafts 24 of the engine means as well as the generator rotor shaft 29 are arranged substantially parallel and connected by the gearing referred to at the lower part of the installation. In this way, both the generator and the exciter may be operated directly by rotatable elements receiving power from the engine means.

Figure 3:
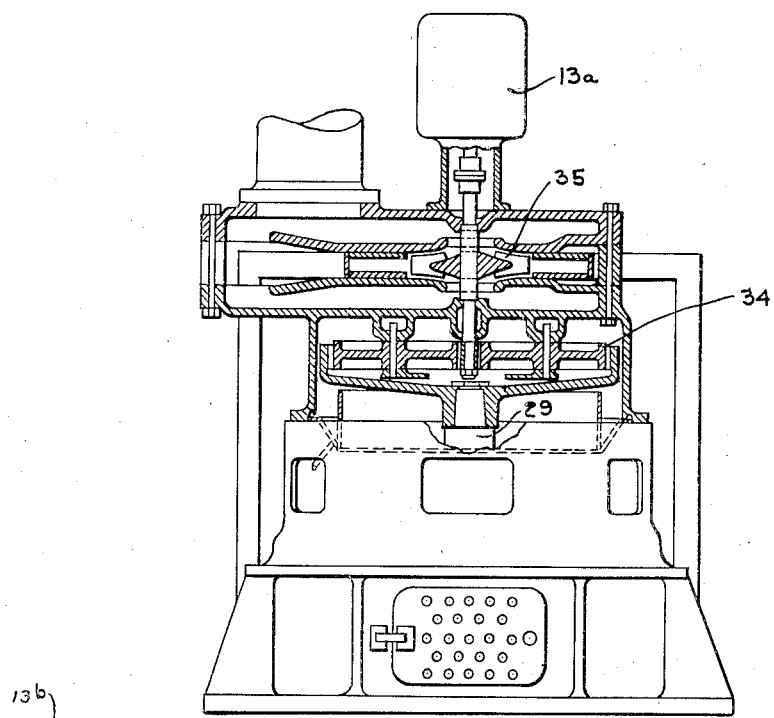

In Fig. 3, I show a modified arrangement of an exciter 13$^a$ whose rotor is driven from the generator shaft 29 through the intermediary of speed increasing gearing 34 and the scavenge blower 35. Owing to the relatively greater speed, the exciter 13$^a$ of Fig. 3 may be made smaller than the exciter 13 of Fig. 1; however, with the employment of similar scavenge blower apparatus, as shown in Figs. 1 and 3, the arrangement shown in Fig. 1 is advantageous for the reason that the vertical height of a car may be utilized to better advantage.

Figure 4:
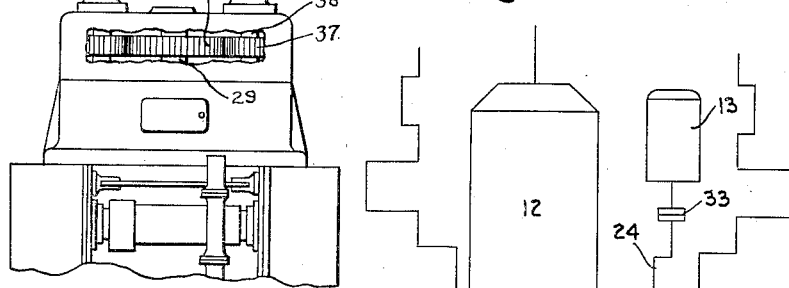

In Fig. 4, I show a further modified arrangement of exciter means which is peculiarly suitable for use in connection with the gear type of scavenging blower apparatus. In general, in accordance with the last-named application, the generator is depressed so as to minimize the vertical height of the installation, this result, in part, being permitted by the geared type of blower apparatus. In Fig. 4, I show fragmentarily such apparatus wherein the generator rotor shaft 29 is connected to a gear 36, the latter meshing with pinions 37. Four pinions 37 are preferably distributed about the periphery of the gear and housing structure cooperates therewith so that each pinion 37 and the cooperating center gear constitute a gear pumping pair, all of the gear pumping pairs being utilized for the purpose of developing air under pressure to be supplied to the engine cylinders for scavenging the latter. This arrangement is well adapted for the purpose of operating the exciters 13$^b$, the latter having the rotors thereof connected to shafts 38 driven by the pinions 37. Since the pinions 37 are materially less in diameter than the central driving gear 36, each of the exciters 13$^b$ will be driven at relatively a much greater speed than the generator shaft 29 with the result that each exciter may be made relatively smaller than is the case where the exciter is driven from a crank shaft. Furthermore, the blower arrangement shown in Fig. 4 makes it possible to still further reduce the size of the exciter in that a plurality of exciters may be used instead of one, as there may be an exciter driven by each of the pinions 37; however, I prefer an arrangement wherein only a pair of the exciters 13$^b$ is employed.

From the foregoing, it will be apparent that I have devised a power plant installation embodying a prime mover, a generator, and exciter means all carried by a common supporting structure and having the lateral boundary thereof defined by the prime mover means, whereby floor space for an installation is economized. Furthermore, as the engine cylinders are disposed horizontally and in square formation, an installation may satisfy to the best advantage the space limitations existing in railway rolling stock practise.

While I have shown my invention in but three forms, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

I claim:

1. In power plant apparatus, the combination of a generator, an exciter supported by the generator, a prime mover supporting the generator, and means for transmitting motion from the prime mover to the generator and to the exciter.

2. In power plant apparatus, the combination of engine means having a plurality of driven shafts, a generator having a rotor shaft, means for transmitting power from all of said driven shafts to the rotor shaft, an exciter, and means for transmitting power from one of said shafts to the exciter.

3. In power plant apparatus, the combination of engine means having a plurality of parallel crank shafts, a generator having a rotor shaft parallel to the crank shafts, gearing for connecting the shafts at one end, an exciter, and means associated with the other end of one of said shafts for driving the exciter.

4. In power plant apparatus, the combination of engine means including a plurality of vertical crank shafts, a generator having a vertical rotor shaft, means associated with the lower ends of the shafts for transmitting power from the crank shafts to the rotor shaft, an exciter, and means associated with the upper end of one of said shafts for driving the exciter.

5. In power plant apparatus, the combination of a frame, engine means supported by the frame and including a plurality of crank shafts, a generator supported by the frame and including a rotor shaft, means for transmitting power from the crank shafts to the rotor shaft, an exciter carried by the generator, and means for transmitting power from one of said shafts to the exciter.

6. In power plant apparatus, the combination of a frame, engine means disposed about and carried by the frame and including a plurality of vertical crank shafts, a generator carried by the frame with a part thereof depending within the frame and a part thereof extending above the frame, said generator including a vertical shaft, means associated with the lower ends of said shafts for transmitting power from the crank shafts to the rotor shaft, an exciter disposed above the frame and carried by the generator, and means associated with the upper end of one of said shafts for transmitting power from the latter to the exciter.

7. In power plant apparatus, the combination of a vertical polyhedral frame, polyhedral engine means surrounding and carried by the frame and including a plurality of vertical crank shafts, a generator carried by the frame and including a vertical rotor shaft, means associated with the lower ends of said shafts for transmitting power from the crank shafts to the rotor shaft, an exciter, and means associated with the upper end of one of said shafts for transmitting power therefrom to the exciter.

8. In power plant apparatus, the combination of a vertical polyhedral frame, polyhedral engine means surrounding and carried by the frame and including a plurality of vertical crank shafts, a generator carried by the frame and including a vertical rotor shaft, means associated with the lower ends of said shafts for transmitting power from the crank shafts to the rotor shaft, an exciter disposed above and alined with one of the crank shafts, and means for transmitting power from the last-named crank shaft to the exciter.

9. In power plant apparatus, the combination of a vertical frame, a prime mover disposed about and supported laterally by the frame, a generator and an exciter supported by the frame, and means for transmitting power from the prime mover to the generator and to the exciter.

10. In power plant apparatus, the combination of a vertical frame, a prime mover disposed about and supported laterally by the frame, a generator and an exciter supported by the top of the frame, and means for transmitting power from the prime mover to the generator and to the exciter.

11. In power plant apparatus, the combination of engine means having a plurality of driven shafts, a generator disposed at one end of the engine means, said generator having a rotor shaft, means for transmitting power from all of said driven shafts to the rotor shaft, an exciter disposed laterally of the generator, and means for transmitting power from one of said shafts to the exciter.

12. In power plant apparatus, the combination of engine means having a plurality of driven shafts, a generator disposed at one end of the engine means, said generator having a rotor shaft, means for transmitting power from all of said driven shafts to the rotor shaft, and an exciter supported upon the generator and connected to one of the driven shafts of said engine means.

In testimony whereof, I have hereunto subscribed my name this 22nd day of March, 1927.

HERBERT T. HERR.